April 18, 1939.   R. A. SANDBERG   2,155,063
AUTOMOBILE LOCKING STRUCTURE
Filed Dec. 27, 1937
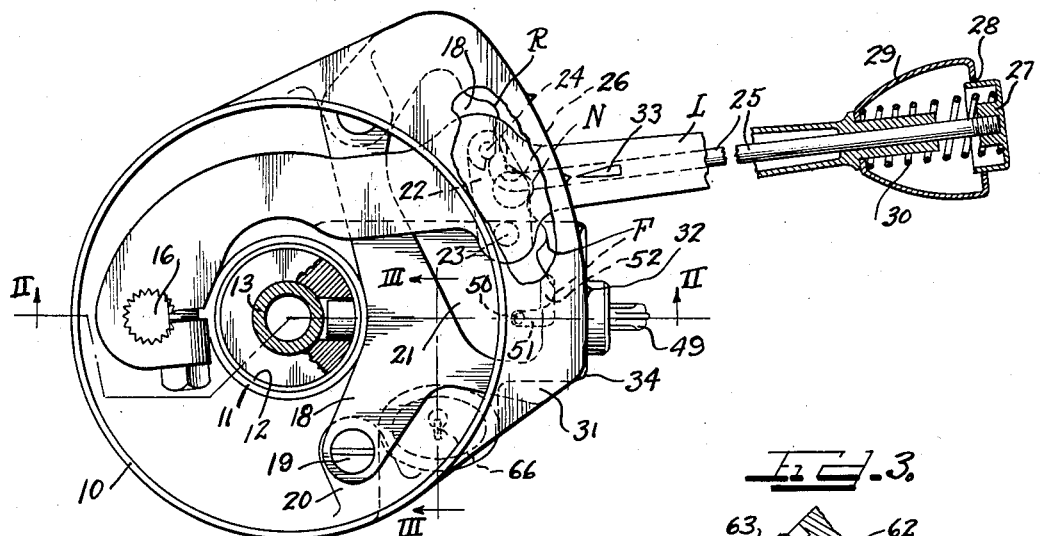
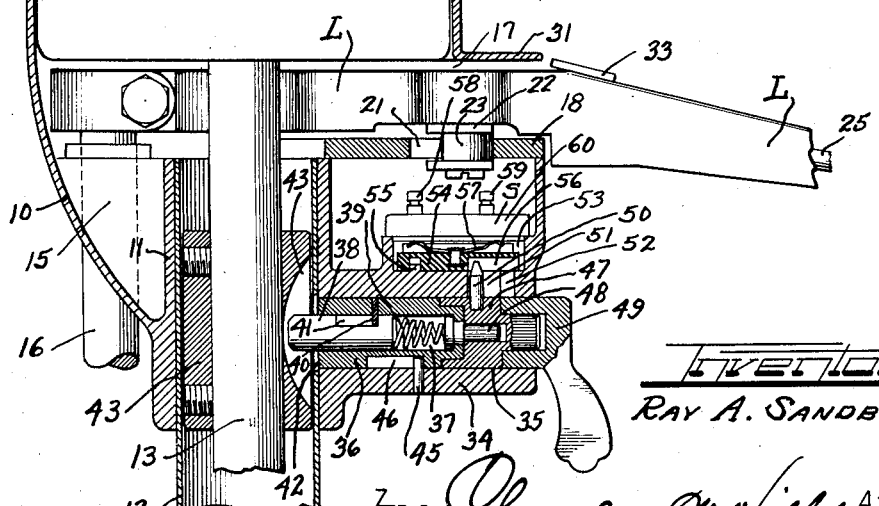
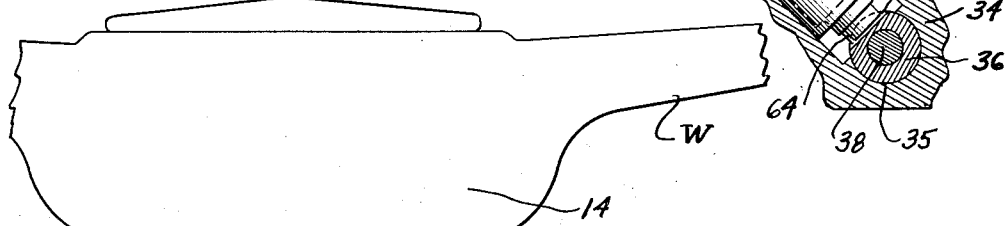
Inventor
Ray A. Sandberg.

Patented Apr. 18, 1939

2,155,063

UNITED STATES PATENT OFFICE 2,155,063

AUTOMOBILE LOCKING STRUCTURE

Ray A. Sandberg, Waukegan, Ill., assignor, by mesne assignments, to Houdaille-Hershey Corporation, Detroit, Mich., a corporation of Michigan Application December 27, 1937, Serial No. 181,872

1 Claim. (Cl. 70—252)

This invention relates to automobile locking structures particularly adaptable in installations where a supporting housing is secured to the upper end of the steering column below the steering wheel for support of controlling structures, as for example a setting lever for controlling the setting and selection of the transmission.

In this invention, the locking arrangement is for locking the steering, or for locking both the steering and the ignition. Steering and ignition locks have been applied to the steering column and anchored to the instrument panel, these locks being separate structures applied to the steering column some distance below the steering wheel.

An important object of this invention is to intimately associate the lock with supporting structure on the steering column below the wheel, as for example the housing for supporting a transmission selection controlling lever. The lock might be a separate structure located within or on the lever supporting structure, but preferably the body of the lock and the supporting structure are part of an integral supporting structure such as a die casting. Such location of the lock will bring it up close under the steering wheel and above knee level so that in case of accident, the lock will not be struck by the knee or other part of the body of the driver.

My improved arrangement and construction is incorporated in the structure shown on the accompanying drawing, in which drawing:

Figure 1 is a plan view of the supporting structure for a transmission selection controlling lever partly in section and partly broken away;

Figure 2 is a section on plane II—II of Figure 1; and

Figure 3 is a section on plane III—III of Figure 1.

As shown, the structure to which the lock mechanism is applied comprises a cup-shaped housing 10 having a sleeve part 11 extending upwardly therein, this sleeve part receiving and being rigidly secured to the upper end of a steering column 12 through which extends the steering shaft 13 which at its upper end is secured to the hub 14 of the steering wheel W, the hub closing the upper end of the housing 10. The housing or supporting structure 10 has a boss 15 for journaling the upper end of the shaft 16 which, at its lower end, is connected by suitable linkage or leverage with mechanism for selecting and setting the transmission. Clamped to the upper end of the shaft 16 is the setting lever L by which the shaft 16 may be rotated for the desired gear selection, this lever extending laterally out of the housing 10 through the side opening 17. Below the lever, a quadrant plate 18 is secured, as by screws 19, to bosses 20 of the wall of the housing 10, this plate being cut away to leave the clearance opening 21 in whose outer edge are latching notches corresponding with the various transmission settings, the notch N corresponding with neutral setting of the transmission, the notch R corresponding to reverse setting, and the notches F corresponding to various forward speeds.

The lever L supports a latch member 22 which is pivoted to the lever by a pin 23, the free end of the lever having a pin 24 engaged by the end of the latch actuating rod 25 which extends outwardly through the lever, the latch member or pawl 22 having pivoted thereto intermediate its ends a latch roller 26 for engaging in the notches of the quadrant plate.

The latch rod 25 extends a distance beyond the outer end of the lever body and has a button 27 secured to its end, the button operating through the opening 28 in the end of a knob frame 29 seated on and secured to the lever body, a spring 30 tending to hold the button and the latch rod in outer position for yieldable engagement of the latch roller with the quadrant notches so as to yieldingly lock the lever in any of its set positions. Upon pressing on the button 27 the latch pawl will be swung to withdraw the latch roller from the notch then engaged thereby so that the lever may be readily swung to another setting position to be yieldably held by the latch in said position when the button 27 is released.

An extension 31 on the housing 10 overhangs the quadrant plate 18 and is provided with points or designations 32 corresponding with the quadrant notches, and the lever has a pointer 33 thereon for assisting in movement of the lever for the desired transmission setting.

The body 34 of the lock structure shown extends laterally from the sleeve 11 on the housing 10, and the lock body is preferably an integral part of the die cast housing 10. The body 24 has the bore 35 therethrough for the lock bolt and ignition switch operating structure. The lock bolt barrel 36 has a bore 37 for the lock bolt 38 which is urged outwardly by a spring 39, the outward movement being limited by a stop plate 40 extending into the slot 41 of the bolt. The bolt when projected extends through the opening 42 in the steering column 12 and into the locking notch 43 in the bushing 44 within the steering column and secured to the steering shaft 13. A pin 45 secured at the body 34 extends into the channel 46 in the lock bolt barrel to limit the longitudinal shifting movement of the lock bolt structure.

In the outer end of the bore 35 is the switch actuating element 47 coaxial with the lock bolt barrel and connected for rotation relative thereto by means of a pin 48 secured to the element 47 and having its head within the bore 37 of the lock bolt barrel. A lever 49 is secured to the outer ends of the switch actuating element 47, and the lock bolt barrel, the switch actuating element 47, and the lever, may move as a whole longitudinally in the bore 35.

The switch actuating element 47 has an actuating pin 50 extending therefrom through an L-shaped slot in the body 34 comprising the longitudinally extending leg 51 and the transversely extending leg 52.

The switch S is located within the outer wall of the housing 10 and within a recess 53. The switch block 54 is pivoted at its inner end on the pin extension 55 from the bottom of the recess 53, the block at the outer end thereof having the slot 56 into which the actuating pin 50 extends. On its upper side the switch block carries the switch blade 57 for cooperation with the terminal contacts 58 and 59 on the cover 60 for the recess 53. The terminal contact 58 and the inner end of the switch blade are in axial alignment at all times with the pivot pin 55, the terminal 58 being usually connected with a current supply source such as the vehicle battery. The other terminal 59 may be connected with the ignition circuit and is normally to one side of the outer end of the switch blade.

Shifting of the lock bolt and switch actuating structure assembly is key controlled. Referring to Figures 1 and 3, the lock structure body 34 has the cross-bore 61 in which is located the casing 62 of a cylinder lock, the cylinder 63 within the casing having a cam 64 at its lower end extending into the slot 65 in the side of the lock bolt barrel. The cylinder is turned by a suitable key inserted in the key hole 66, turning of the cylinder causing the cam to shift the lock bolt and switch actuating structure in the bore 35.

The lock is shown in locking position, the lock bolt 38 extending into the slot 43 in the bushing 44 on the steering shaft so that the steering wheel is locked against turning. The switch actuating pin 50 is within the longitudinal leg 51 of the L-slot so that the switch actuating element 47 cannot be rotated by the lever 49, the switch being in open position with the outer end of the switch blade displaced from the switch circuit terminal 59. When the key is turned to shift the lock bolt and switch actuating assembly outwardly, the lock bolt 38 will be withdrawn from the notch 43 for release of the steering wheel, and the switch actuating pin 50 will come into registration with the transverse slot 52 so that the switch may now be actuated. Upon forward swing of the lever 49 the pin will travel rearwardly in the transverse slot 52 to swing the switch block to carry the outer end of the switch blade into engagement with the ignition circuit terminal 59 for closure of the ignition circuit. Relocking of the steering wheel cannot be accomplished until the switch actuating element 10 is rotated back to switch opening position to bring the pin 50 back into alignment with the longitudinal slot 51, and now when the key is turned the steering is locked and the pin 50 will again lock the switch in circuit opening position. The circuit conductors may be readily brought to the switch terminals through suitable openings in the wall of the housing structure 10 or through the hollow steering column, or through the steering shaft if the shaft is hollow as shown in Figure 1.

With my improved arrangement, the housing structure 10 for the transmission selection lever and the switch structure forms a compact unitary assembly, the housing structure and the lock body structure forming part of a single die casting which can be economically manufactured. Such location of the lock structure will also bring it above knee level so that there will be no chance for injury upon engagement of the person of the driver with the lock structure in case of accident.

I have shown a practical and efficient embodiment of the features of my invention, but I do not desire to be limited to the exact construction or arrangement and operation shown and described as many changes may be made without departing from the scope of the invention.

I claim as follows:

Locking structure for the steering wheel assembly in an automotive vehicle in which a transmission selection lever is located below the steering wheel, said locking structure comprising a cup-shaped housing having an axially extending sleeve integral therewith and receiving and secured to the end of the steering column through which the steering shaft extends and with the open end of the cup receiving and surrounding the lower portion of the wheel hub, said housing having a laterally extending bore adjacent to said sleeve, a lock bolt structure shiftable in said bore for locking the steering shaft to the column, said housing and sleeve defining a recess above said bore, switch structure located within said recess and operable from the exterior of said housing, and a horizontal cross wall in said housing forming a guide support for the selection lever and forming a closure cover for said recess.

RAY A. SANDBERG.